United States Patent Office 3,398,134
Patented Aug. 20, 1968

3,398,134
REACTIVE AZO DYES DERIVED FROM 3-(4-AMINOPHENYL) - 5 - CHLORO - 1,2,4 - THIODIAZOLE AS THE DIAZO COMPONENT
Werner Ball, Heidelberg, and Erwin Hahn, Viernheim, Hesse, Germany, assignors to Badische Anilin- & Soda-Fabrik Aktiengesellschaft, Ludwigshafen (Rhine), Germany
No Drawing. Filed Oct. 18, 1965, Ser. No. 497,476
Claims priority, application Germany, Oct. 28, 1964, B 79,108
7 Claims. (Cl. 260—157)

ABSTRACT OF THE DISCLOSURE

Water-soluble reactive azo dyes of the formula

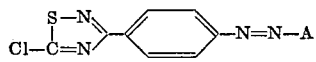

where A is the radical of the coupling component of the formulae

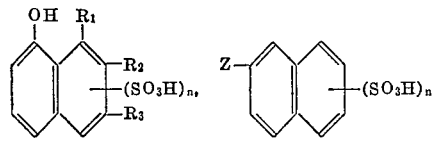

or

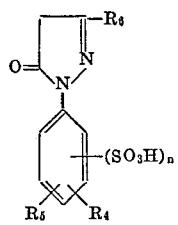

in which $R_1$ is hydrogen, amino, acetylamino, benzoylamino, β-chloropropionylamino or phenylureido, $R_2$ is hydrogen, 4-sulfophenylazo or 4-nitro-2-sulfophenylazo, $R_3$ is hydrogen, fumarylamino, succinylamino or β-sulfopropionylamino, $R_4$ is hydrogen, chloro or methyl, $R_5$ is hydrogen or chloro, $R_6$ is methyl or carboxy, $z$ is hydroxyl or amino, $n$ is one of the integers 1 or 2 with the proviso that the sulfo groups are attached formulae $a$ and $b$ in the 3, 4, 5, 6, 7 or 8 positions and further that only one of $R_1$, $R_2$ and $R_3$ can be other than hydrogen. The dyestuffs dye cellulosic fibers with high color strength and excellent dyebath exhaustion.

The invention relates to new reactive azo dyes which are derived from the diazo component of the formula

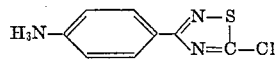

A great number of reactive azo dyes have already been described in the patent literature and are in use all over the world. Reactive dyes for dyeing cotton have found universal acceptance in the dyeing industry inasmuch as this class of dyes offers many advantages over the very fast but expensive vat dyes and the inexpensive but poorly fast direct dyes. Reactive dyes can be produced at a moderate price and yield dyeings of high wash fastness, good light fastness and bright shades. For this reason, they are often preferred to the vat dyes because of their brighter shades and lower price and to the direct dyes because of their high wash fastness. All reactive dyes, whatever reactive group they may have, still have one shortcoming, i.e. only a certain percentgae, as a rule somewhat more than 50 percent of the dye, is chemically attached to the fiber. The rest of the amount of the dye initially used is hydrolyzed to a non-reactive form by the water of the alkaline dyeing liquor. In the soaping step of the dyeing procedure the hydrolyzed dye is removed and is lost by draining off. Therefore, the hydrolysis which competes with the reaction of the dyes with the fibers should be as low as possible, in order that a high yield of fixation is obtained and as large a percentage as possible goes on the fibers thus yielding deep shades. Another possibility of obtaining deeper shades by employing the same or even smaller amounts of dyes than usual resides in seeking dyes which have either greater color strength, i.e. molar extinction, or greater affinity to the fiber.

Among the numerous reactive groups suggested in the literature so far for the production of reactive dyes there have also been described chlorothiazoles and chlorothiodiazoles. Dyes having these groups are very valuable dyestuffs although they also have the above mentioned shortcomings. It was therefore an object of this invention to provide dyes which go on cellulosic fibers and are fixed in a high rate whereas hydrolysis is relatively low. A further object of the invention was to provide reactive dyes which have an excellent color strength, i.e. which have a high molar extinction. Thus dyeing in deep shades can be obtained by employnig smaller amounts of dyes than usual. These objects of the invention are achieved by dyes of the formula

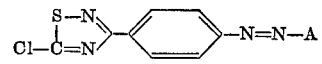

II where A is a radical of the coupling component of the formulae

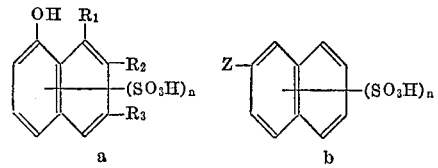

or

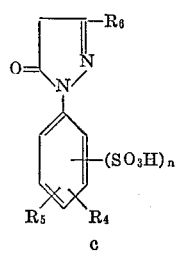

in which $R_1$ represents hydrogen, amino, acetylamino, benzoylamino, β-chloropropionylamino or phenylureido; $R_2$ represents hydrogen, 4-sulfophenylazo, 4-nitro-2-sulfophenylazo or 4-acryloylamino-3-sulfophenylazo; $R_3$ represents hydrogen, fumarylamino, succinylamino or β-sulfopropionlyamino; $R_4$ represents hydrogen, chloro or methyl; $R_5$ represents hydrogen or chloro; $R_6$ represents methyl or carboxy, Z represents hydroxy or amino; and $n$ represents one of the integers 1 and 2 with the proviso that the sulfo groups are attached to the components of Formulae $a$ and $b$ in the 3, 4, 5, 6, 7, or 8 positions and with the further proviso that only one radical of $R_1$, $R_2$ and $R_3$ can be other than hydrogen.

As already mentioned above, reactive dyes containing a chlorothiazol or chlorothiodiazole reactive group have already been described in the literature, namely in Belgian patent specification 630,929. Among numerous amines having these reactive groups there is also mentioned m-aminophenyl-chlorothiodiazole. All the compounds disclosed in the said patent already have excellent tinctorial properties. It was therefore quite unexpected that the specific diazo component as used according to the invention would lead to dyes with still further improved tinctorial properties. In fact the properties of the new dyes are so outstanding that dyeings prepared with these dyes, especially by the so called exhaustion method, exceed dyeings prepared with the same amounts of the corresponding dyes of the meta-compound by nearly twice the depth of color. This is due to a greater molar extinction of the dyes of the invention and a higher affinity to cellulosic fibers, i.e. the dyebath is better exhausted.

Amines having the formula I may be obtained for example from the corresponding nitro compounds by reduction of the nitro group, advantageously by hydrogenation in a solvent in the presence of hydrogenation catalysts, preferably Raney nickel. The corresponding nitro compounds are obtainable for example by reaction of p-nitrobenzamidines with perchloromethylmercaptan by the method described in "Chemische Berichte," 90 (1957) 182.

Diazotization and coupling are carried out by conventional methods.

Examples of coupling components A-H in which A has the above meaning are naphthol sulfonic acids, aminonaphthol sulfonic acids, acylaminonaphthol sulfonic acids, 5-pyrazolone sulfonic acids and also hydroxyquinoline sulfonic acids. Specific examples are: 1-(2-chloro - 5 - sulfophenyl) - 3 - methylpyrazolone - (5), 1 - (2,5 - dichloro - 4 - sulfophenyl) - 3 - methylpyrazolone - (5), - 1 - (2 - methyl - 4 - sulfophenyl) - 3 - methylpyrazolone - (5), 1 - (3 - sulfophenyl) - 3 - methylpyrazolone - (5), 1 - (4 - sulfophenyl) - 3 - methylpyrazolone - (5), 1 - (2,5 - disulfophenyl) - 3 - methylpyrazolone - (5), 1 - (4 - sulfophenyl) - 3 - carboxypyrazolone - (5), 1 - hydroxynaphthalene - 3,6 - disulfonic acid, 1 - hydroxynaphthalene - 3,8 - disulfonic acid, 2 - hydroxynaphthalene - 6,8-disulfonic acid, 2 - aminonaphthalene - 5,7 - disulfonic acid, 1-hydroxynaphthalene - 4,6 - disulfonic acid, 1 - hydroxynaphthalene - 4,7 - disulfonic acid, 1 - acetylamino - 8 - hydroxynaphthalene - 3,6 - disulfonic acid, 1 - benzoylamino - 8 - hydroxynaphthalene - 3,6 - disulfonic acid, 1 - acetylamino - 8 - hydroxynaphthalene - 4,6 - disulfonic acid, 1 - benzoylamino - 8 - hydroxynaphthalene - 4,6 - disulfonic acid or the compounds having the formulae:

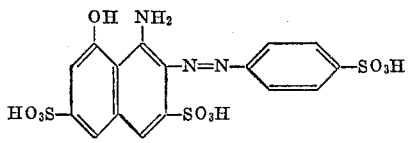

and

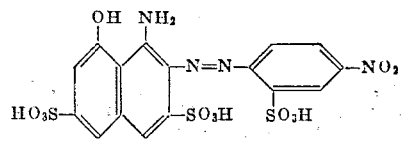

The following examples will further illustrate this invention. The parts and percentages specified in the examples are by weight unless otherwise indicated. Parts by volume bear the same relation to parts by weight as the liter to the kilogram.

EXAMPLE 1

24.2 parts of 3-(4-nitrophenyl)-5-chloro-1,2,4-thiodiazole having a melting point of 148° to 150° C. (obtainable from 4-nitrobenzamidine and perchloromethylmercaptan, for the method see Chem. Ber. 90 (1957) 182) is reduced with hydrogen in 500 parts by volume of dioxane using Raney nickel as catalyst. After the calculated amount of hydrogen has been absorbed, the catalyst is filtered off and the amine obtained is precipitated by adding 1500 parts of icewater. The precipitate is suction filtered and dried at subatmospheric pressure at 50° C. 17.5 parts of 3-(4-aminophenyl)-5-chloro-1,2,4-thiodiazole is obtained; after having been recrystallized from a mixture of alcohol and water (1:1) it melts at 109° to 111° C.

21.2 parts of the 3-(4-aminophenyl)-5-chloro-1,2,4-thiodiazole thus obtained is dissolved in 220 parts of glacial acetic acid. Then 25 parts by volume of 36% hydrochloric acid is added and the amine is diazotized at 5° to 10° C. with 7 parts of sodium nitrite dissolved in 200 parts by volume of water. The diazo solution is added slowly to a neutral solution of 23 parts of 1-naphthol-4-sulfonic acid in 300 parts by volume of water, the reaction of the mixture being kept at pH 4 to 5 by gradual addition at the same time of 30 parts of sodium hydrogen carbonate. The deposited dye is suction filtered and dried. It dyes cotton bright red shades by the conventional methods for reactive dyes.

Dyes obtained from the diazo component 3-(4-aminophenyl)-5-chloro-1,2,4-thiodiazole and the coupling components indicated in the following table are obtained in the same way and give the shades indicated on cotton:

| Ex. No. | Coupling component | Shade on cotton |
|---|---|---|
| 2 | 1-(2-chloro-5-sulfophenyl)-3-methyl-pyrazolone-(5) | Yellow. |
| 3 | 1-(2,5-dichloro-4-sulfophenyl)-3-methylpyrazolone-(5) | Do. |
| 4 | 1-(2-methyl-4-sulfophyenyl)-3-methylpyrazolone-(5) | Do. |
| 5 | 1-(3-sulfophenyl)-3-methylpyrazolone-(5) | Do. |
| 6 | 1-(4-sulfophenyl)-3-methylpyrazolone-(5) | Do. |
| 7 | 1-(2,5-disulfophenyl)-3-methyl-pyrazolone-(5) | Do. |
| 8 | 1-(4-sulfonyl)-3-carboxypyrazolone-(5) | Do. |
| 9 | 1-hydroxynaphthalene-3,6-disulfonic acid | Scarlet. |
| 10 | 1-hydroxynaphthalene-3,8-disulfonic acid | Do. |
| 11 | 2-hydroxynaphthalene-6,8-disulfonic acid | Orange. |
| 12 | 2-aminonaphthalene-5,7-disulfonic acid | Do. |
| 13 | 1-hydroxynaphthalene-4,6-disulfonic acid 1-hydroxynaphthalene-4,7-disulfonic acid. | Red. |
| 14 | 1-acetylamino-8-hydroxynaphthalene-3,6-disulfonic acid | Do. |
| 15 | 1-benzoylamino-8-hydroxynaphthalene-3,6-disulfonic acid. | |
| 16 | 1-acetylamino-8-hydroxynaphthalene-4,6-disulfonic acid | Do. |
| 17 | 1-benzoylamino-8-hydroxynaphthalene-4,6-disulfonic acid | Do. |
| 18 | 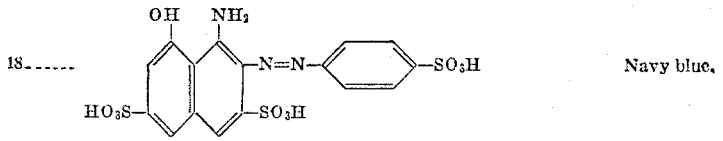 | Navy blue. |

| Ex. No. | Coupling component | Shade on cotton |
|---|---|---|
| 19 | [naphthalene with OH, NH₂, SO₃H, HO₃S, -N=N-C₆H₃(SO₃H)(NO₂)] | Do. |
| 20 | [naphthalene with OH, HO₃S, -NHCOCH=CH-COOH] | Scarlet. |
| 21 | [naphthalene with OH, HO₃S, -NHCOCH₂CH₂COOH] | Do. |
| 22 | [naphthalene with OH, HO₃S, -NHCOCH₂CH₂SO₃H] | Do. |
| 23 | [naphthalene with OH, NHCOCH₂CH₂Cl, HO₃S, SO₃H] | Red. |
| 24 | [naphthalene with OH, NHCONH-C₆H₅, HO₃S, SO₃H] | Do. |
| 25 | [naphthalene with OH, NH₂, HO₃S, SO₃H, -N=N-C₆H₃(SO₃H)-NHCOCH=CH₂] | Navy blue. |

We claim:
1. A dye of the formula

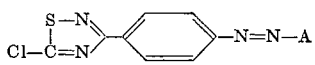

where A is the radical of a coupling component selected from the group consisting of the formulae

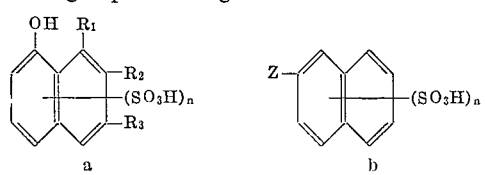

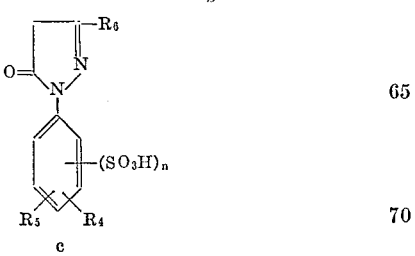

in which $R_1$ represents a member selected from the group consisting of hydrogen, amino, acetylamino, benzoylamino, β-chloropropionylamino and phenylureido, $R_2$ represents a member selected from the group consisting of hydrogen, 4-sulfophenylazo and 4-nitro-2-sulfophenylazo, $R_3$ represents a member selected from the group consisting of hydrogen, fumarylamino, succinylamino and β-sulfopropionylamino, $R_4$ represents a member selected from the group consisting of hydrogen, chloro and methyl, $R_5$ represents a member selected from the group consisting of hydrogen and chloro, $R_6$ represents a member selected from the group consisting of methyl and carboxy, Z represents a member selected from the group consisting of hydroxyl and amino, and $n$ represents one of the integers 1 and 2 with the proviso that sulfo groups are attached to the components of Formulae $a$ and $b$ in the 3, 4, 5, 6, 7, or 8 position and with the further proviso that only one radical of $R_1$, $R_2$, and $R_3$ can be other than hydrogen.

2. The dye of the formula

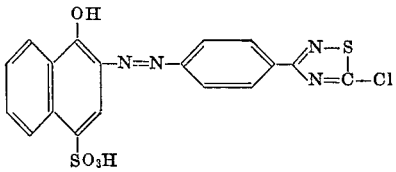

3. The dye of the formula
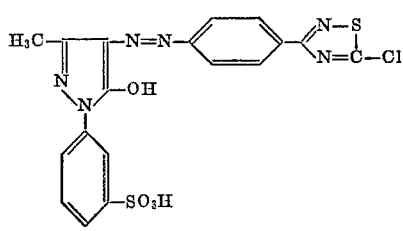
4. The dye of the formula
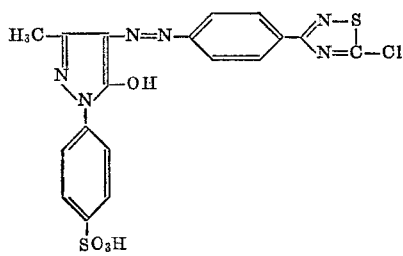
5. The dye of the formula
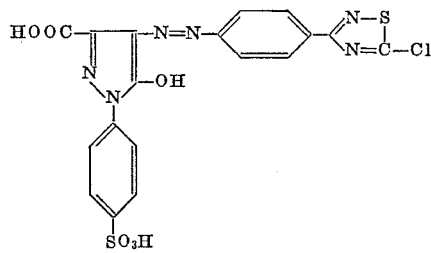
6. The dye of the formula
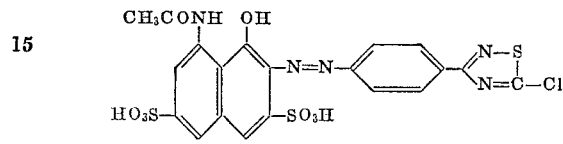
7. The dye of the formula
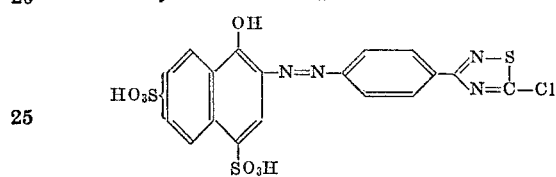
References Cited
FOREIGN PATENTS
1,359,435   3/1964   France.
FLOYD D. HIGEL, *Primary Examiner.*